United States Patent
Tang et al.

(10) Patent No.: US 10,707,541 B2
(45) Date of Patent: Jul. 7, 2020

(54) LITHIUM-ION BATTERY CHARGING METHOD FOR CORRECTING AND COMPENSATING VOLTAGE

(71) Applicant: GUANGZHOU FULLRIVER BATTERY NEW TECHNOLOGY CO., LTD., Guangzhou, Guangdong (CN)

(72) Inventors: Shengcheng Tang, Guangdong (CN); Shihua Zeng, Guangdong (CN); Li Li, Guangdong (CN); Shiming Yi, Guangdong (CN)

(73) Assignee: GUANGZHOU FULLRIVER BATTERY NEW TECHNOLOGY CO., LTD., Guangzhou (CN)

( * ) Notice: Subject to any disclaimer, the term of this patent is extended or adjusted under 35 U.S.C. 154(b) by 379 days.

(21) Appl. No.: 15/723,216

(22) Filed: Oct. 3, 2017

(65) Prior Publication Data

US 2018/0048031 A1    Feb. 15, 2018

Related U.S. Application Data

(63) Continuation of application No. PCT/CN2016/105092, filed on Nov. 8, 2016.

(30) Foreign Application Priority Data

Dec. 31, 2015  (CN) .......................... 2015 1 1032969

(51) Int. Cl.
*H01M 10/44* (2006.01)
*H02J 7/00* (2006.01)
(Continued)

(52) U.S. Cl.
CPC .......... *H01M 10/44* (2013.01); *H01M 10/02* (2013.01); *H01M 10/0525* (2013.01); *H02J 7/0086* (2013.01)

(58) Field of Classification Search
CPC .............................. H01M 10/44; H02J 7/0086
(Continued)

(56) References Cited

U.S. PATENT DOCUMENTS

| 6,040,684 | A | * | 3/2000 | Mitchell | ............... | H01M 10/44 320/139 |
| 6,222,345 | B1 | * | 4/2001 | Yamanashi | ........... | H02J 7/0077 320/132 |

(Continued)

FOREIGN PATENT DOCUMENTS

| CN | 101388562 A | 3/2009 |
| CN | 101388477 B | 12/2010 |

(Continued)

OTHER PUBLICATIONS

International Search Report of PCT Patent Application No. PCT/CN2016/105092 dated Jan. 5, 2017.
(Continued)

*Primary Examiner* — Jerry D Robbins (57) ABSTRACT

Lithium-ion battery charging method for correcting and compensating voltage, when it is charged to limited charge voltage of the battery, the battery stops charging, or start charging by constant-voltage charging and won't stop charging until the charging current is lower than 50%-99.99% of the current before constant-voltage charging; the limited charge voltage of the battery positive and negative electrodes is set as $3U_0-U_S-U_{SO}$; the battery would be rapidly charged and charged close to saturation, and have better cycle life than the battery charged by constant-current and constant-voltage charging method of the same charging rate; or with the same cycle frequency, the battery charged with the charging method of the present invention would have larger discharge capacity.

14 Claims, 2 Drawing Sheets

(51) Int. Cl.
  *H01M 10/02* (2006.01)
  *H01M 10/0525* (2010.01)
(58) Field of Classification Search
  USPC .......................................................... 320/143
  See application file for complete search history.

(56) References Cited

U.S. PATENT DOCUMENTS

2003/0112011 A1* 6/2003 Guiheen ............ G01R 31/3648
  324/429
2011/0156660 A1* 6/2011 Cheng ................... H01M 10/44
  320/157

FOREIGN PATENT DOCUMENTS

CN   105609890 A   5/2016
JP   2004282881 A   10/2004

OTHER PUBLICATIONS

1st Office Action of counterpart Chinese Patent Application No. 201511032969.8 dated Sep. 25, 2017.

* cited by examiner

LITHIUM-ION BATTERY CHARGING METHOD FOR CORRECTING AND COMPENSATING VOLTAGE

CROSS-REFERENCE TO RELATED APPLICATION

This application is a continuation application of PCT Application No. PCT/CN2016/105092 filed on Nov. 8, 2016 which claims priority to Chinese Patent Application No. 201511032969.8 filed on Dec. 31, 2015, the entire contents of which are hereby incorporated by reference.

FIELD OF THE INVENTION

The present invention relates to technical field of battery charging method, and more particularly to charging method of lithium-ion battery and polymer lithium-ion battery.

BACKGROUND OF THE INVENTION

Chinese Patent CN101388477B discloses a rapid charging method which increases the limited charge voltage to compensate the internal voltage drop of the battery. During the charging of lithium-ion battery and polymer lithium-ion battery, stop charging the battery when it is charged to the limited charge voltage; the limited charge voltage between the two poles of the battery is set as $U=2U_0-U_S$, wherein $U_S$ is the stabilized voltage dropped from $U_0$ which the battery is charged to by constant-current charging; wherein $U_0$ is charge cut-off voltage and commonly recognized by the industry as the charge cut-off voltage used by the low power constant-current and constant-voltage charging method; The stabilized voltage $U_S$ is selected by conducting timing when stopping constant-current charging the battery and starting to lay up the battery; from some time point, when the open-circuit voltage drop of the battery over a certain time period is smaller than a certain value, the battery voltage would reach a steady state; the voltage at the first time point is selected as the stabilized voltage $U_S$ of the battery.

When the method is applied in lithium iron phosphate battery, $U_0$ is charge cut-off voltage of 3.6V which is commonly recognized by the industry as the charge cut-off voltage used in the low power constant-current and constant-voltage charging method; the battery is charged to $U=2U_0-U_S$, which is not charged to saturation, but only reaches 88% of the saturation point, thus failing to make the most of the battery. Also 3.5V, 3.65V and 3.7V are commonly recognized by the industry as the charge cut-off voltage used by the low power constant-current and constant-voltage charging method, however the battery is charged to $U=2U_0-U_S$ which is not charged to saturation, therefore, they all could not make the most of the battery efficiency.

When the method is applied in Lithium cobalt battery, $U_0$ is charge cut-off voltage of 4.2V which is commonly recognized by the industry as the charge cut-off voltage used by the low power constant-current and constant-voltage charging method; the battery is charged to $U=2U_0-U_S$ and is not charged to saturation, but only reaches 97% of the saturation point, which could not make the most of the battery.

In order to make the most of the battery efficiency, it is necessary to make appropriate corrections to the limited charge voltage.

SUMMARY OF THE INVENTION

The present invention provides a lithium-ion battery charging method for correcting and compensating voltage so as to make the most of the battery efficiency.

Definition

Ideal Battery Charging: Charge the lithium-ion battery by constant-current & constant-voltage charging method, break the open-circuit, then stabilized voltage reaches constant-voltage charging voltage. Theoretically charging the lithium-ion battery by constant-current and constant-voltage charging method, when the lithium-ion battery is charged to infinitesimal current, its open-circuit stabilized voltage could reach constant-voltage charging voltage after the charging circuit is broken. While practically charging the lithium-ion battery by constant-current and constant-voltage charging method, when the lithium-ion battery is charged to self-discharge current, the charging current and self-discharge current of the lithium-ion battery would be in a dynamic equilibrium state; when the charging circuit is broken, the open-circuit stabilized voltage of the lithium-ion battery could be approximate to the value of constant-voltage charging voltage. Standard stabilized voltage: constant-current charge the lithium-ion battery with the current regulated by the Industry Standard or stipulated by the suppliers to $U_0$ and then constant-voltage charge the lithium-ion battery to the cut-off current regulated by the Industry Standard or stipulated by the suppliers, then stop charging the lithium-ion battery. Start timing when stopping constant-current and constant-voltage charging the lithium-ion battery and starting to lay up the battery, from some time point, the open-circuit voltage-drop of the lithium-ion battery would be smaller than some certain value during some certain time period, which means the battery voltage has already been in a stable state, then select the voltage corresponding to the first time point of the time period as stabilized voltage $U_{SO}$ of the battery.

Freedom degree of lithium-ion means the degree of lithium-ion's free activities among the positive electrode. During the charging process of the lithium-ion battery, the lithium-ion would de-intercalate from the cathode and intercalate into the anode through electrolyte. The lithium-ion is freely distributed in the lattice of the positive electrode and would find the niche place that most fits for itself. During the de-intercalation process, the lithium-ion with closer-range and of larger freedom degree would be more easily to de-intercalate from the cathode, and the lithium-ion with longer-range and of smaller freedom degree would be less easily to de-intercalate from the cathode. The lithium-ion strictly bond to the cathode has smaller freedom degree and more difficult to de-intercalate from the cathode, or only de-intercalate from the cathode with more charge energy.

Principle

The charging method disclosed by CN101388477B would stop charging when the lithium-ion battery is charged to $U=2U_0-U_S=U_0+(U_0-U_S)$, which compensates the internal voltage drop $(U_0-U_S)$ of the battery, said voltage drop $(U_0-U_S)$ is caused by constant-current I charging to $U_0$ and being laid up; However, it only compensates the ohmic voltage drop, the concentration polarization voltage drop, electrochemical polarization voltage drop and other impedance voltage drop, without considering that the lithium-ion battery doesn't reach saturation when it is charged to $U_0$ with constant-current I and the de-intercalation of some lithium-ion of smaller freedom degree, thus the voltage drop compensated fails to charge the battery to 100% saturation, which is not an ideal charging state. Also the charging method disclosed by CN101388477B fails to address the effects of equipment error and measuring error. The 100% saturation means that constant-current charge the lithium-ion battery with the current regulated by the Industry Standard or stipulated by the suppliers to $U_0$ and then constant-voltage charging the lithium-ion battery to the cut-off current regulated by the Industry Standard or stipulated by the suppliers, then stop charging the lithium-ion battery; constant—current discharge the lithium-ion battery with the current regulated by the Industry Standard or stipulated by the suppliers to discharge cut-off voltage regulated by the Industry Standard or stipulated by the suppliers, the discharge capacity would be 100%, thus the charging state of the battery before discharging would be 100% saturation. The present invention adds $(U_0-U_{SO})$ to $U=2U_0-U_S=U_0+(U_0-U_S)$, charging the battery to $U=U_0+(U_0-U_S)+(U_0-U_{SO})=3U_0-U_S-U_{SO}$, and takes the de-intercalation of some lithium-ion of smaller freedom degree into consideration, thus making charging the battery approximate to 100% saturation, reducing the effects of equipment errors and measuring errors, which is much more close to ideal charging state.

The technical solution disclosed by the present invention eliminates the above-mentioned defects as follows:

Charge the battery to saturation by standard constant-current and constant-voltage charging method and then lie up the battery in an open-circuit, it is found that the standard stabilized voltage of the lithium iron phosphate battery is greatly different from its standard charge cut-off voltage, while the standard stabilized voltage of the lithium cobalt battery is little different from its standard charge cut-off voltage, which directly correlates to the low charging saturation of lithium iron phosphate battery and high charging saturation of lithium cobalt battery.

To make the most of the battery efficiency and charge the battery to saturation, it is necessary to add modified value $(U_0-U_{SO})$ to the original value $U=U_0+(U_0-U_S)$, the voltage value for correcting and compensating would be:

$$U=U_0+(U_0-U_S)+(U_0-U_{SO})=3U_0-U_S-U_{SO}$$

Charge the lithium iron phosphate battery and lithium cobalt battery based on the voltage value, the battery would be charged more close to 100% saturation by correcting and compensating voltage.

It is tested and verified on ternary $(LiNi_xMn_yCo_zO_2)$ lithium-ion battery, lithium manganate $(LiMn_2O_4)$ battery and lithium titanate $(Li_4Ti_5O_{12})$ battery in the same way and achieves the same effect.

Lithium-ion battery charging method for correcting and compensating voltage, during the charging process, stop charging the battery when it is charged to limited charge voltage of the battery, wherein the limited charge voltage between the battery positive and negative electrodes is set as $3U_0-U_S-U_{SO}$.

Lithium-ion battery charging method for correcting and compensating voltage, during the charging process, start to constant-voltage charge the battery when it is charged to the voltage limited charge voltage U, keep on constant-voltage charging until the charging current decreases to 50%~99.99% of the charging current before constant-voltage charging, and then stop charging the battery, wherein the limited charge voltage between the battery positive and negative electrodes is set as $3U_0-U_S-U_{SO}$.

$U_{SO}$ is the standard stabilized voltage dropped from $U_0$ which the battery is charged to by constant-current and constant-voltage charging, whose value is selected by the following steps: when stopping constant-current and constant-voltage charging the lithium-ion battery and starting to lay up the lithium-ion battery, start timing; from some time point, the open-circuit voltage-drop of the lithium-ion battery would be smaller than some certain value during some certain time period, which means the battery voltage has already been in a stable state, then select the voltage corresponding to the first time point of the time period as stabilized voltage $U_{SO}$ of the battery.

Specifically, constant-current charge the lithium-ion battery with the current regulated by the Industry Standard or stipulated by the suppliers to $U_0$ and then constant-voltage charge the lithium-ion battery to the cut-off current regulated by the Industry Standard or stipulated by the suppliers, then stop charging the lithium-ion battery; when stopping constant-current and constant-voltage charging the lithium-ion battery and starting to lay up the lithium-ion battery, start timing, from some time point, the open-circuit voltage-drop of the lithium-ion battery would be smaller than some certain value during some certain time period, which means the battery voltage has already been in a stable state, then select the voltage corresponding to the first time point of the time period as standard stabilized voltage $U_{SO}$ of the battery $U_S$ is the stabilized voltage dropped from $U_0$ which the battery is charged to by constant-current charging, whose value is selected by the following steps: start timing when stopping constant-current and constant-voltage charging and starting to lay up the lithium-ion battery, from some time point, the open-circuit voltage-drop of the lithium-ion battery would be smaller than some certain value during some certain time period, which means the battery voltage has already been in a stable state, then select the voltage corresponding to the first time point of the time period as stabilized voltage $U_S$ of the battery.

wherein $U_0$ is standard charge cut-off voltage which is commonly recognized by the industry as the charge cut-off voltage used by the low power constant-current and constant-voltage charging method.

As an improved technical solution, the present invention provides a lithium-ion battery charging method for correcting and compensating voltage, wherein the battery could be charged to $U=3U_0-U_S-U_{SO}$ by constant-current charging method, and then stop charging.

As an improved technical solution, the present invention provides a lithium-ion battery charging method for correcting and compensating voltage, wherein the battery could be charged to $U=3U_0-U_S-U_{SO}$ by multi-section constant-current charging method and then stops charging, $U_S$ is determined by measuring the current of the end-section before stopping charging.

As an improved technical solution, the present invention provides a lithium-ion battery charging method for correcting and compensating voltage, start to constant-voltage charge the battery when it is charged to $U=3U_0-U_S-U_{SO}$ by multi-section constant-current charging method, keep on constant-voltage charging until the charging current decreases to 50%~99.99% of the charging current before constant-voltage charging, and then stop charging the battery; $U_S$ is determined by measuring the current of the end-section before stopping charging.

As an improved technical solution, the present invention provides a lithium-ion battery charging method for correcting and compensating voltage, wherein the battery could be charged to $U=3U_0-U_S-U_{SO}$ by non-constant-current charging method and then stops charging, $U_S$ is determined by measuring the current of the end-section before stopping charging.

As an improved technical solution, the present invention provides a lithium-ion battery charging method for correcting and compensating voltage, wherein constant-voltage charge the battery when it is charged to $U=3U_0-U_S-U_{SO}$ by non-constant-current charging method, keep on constant-voltage charging until the charging current decreases to 50%~99.99% of the charging current before constant-voltage charging, and then stop charging the battery; $U_S$ is determined by measuring the current of the end-section before stopping charging.

As a measurement method for $U_{SO}$, the present invention provides a lithium-ion battery charging method for correcting and compensating voltage, when stopping constant-current and constant-voltage charging the lithium-ion battery and starting to lay up the lithium-ion battery, start timing; select every 5 minutes as a time interval; from some time point, the open-circuit voltage-drop of the lithium-ion battery would be smaller than 2 mV during 5 minutes time interval, which means the battery voltage has already been in a stable state, then select the voltage corresponding to the first time point of said 5 minutes as standard stabilized voltage $U_{SO}$ of the battery.

As a measurement method for $U_{SO}$, the present invention provides a lithium-ion battery charging method for correcting and compensating voltage, when stopping constant-current and constant-voltage charging the lithium-ion battery and starting to lay up the lithium-ion battery, start timing; select every 10 minutes as a time interval; from some time point, the open-circuit voltage-drop of the lithium-ion battery would be smaller than 1 mV during 10 minutes time interval, which means the battery voltage has already been in a stable state, then select the voltage corresponding to the first time point of said 10 minutes as standard stabilized voltage $U_{SO}$ of the battery.

It should be clarified that the standard stabilized voltage $U_{SO}$ correlates to standard charge cut-off voltage $U_0$ and standard charge cut-off current, and is not that relevant to the charging rate, or even has nothing to do with the charging rate.

It is well-known that for lithium iron phosphate battery, the standard charge cut-off voltage $U_0$ could be 3.5V, 3.6V, 3.65V or 3.7V. Different value of $U_0$ would attain different value of standard capacity $C_0$. The definition of $C_0$: constant-current charge the lithium-ion battery with the current regulated by the Industry Standard or stipulated by the suppliers to $U_0$ and then constant-voltage charge the lithium-ion battery to the cut-off current regulated by the Industry Standard or stipulated by the suppliers; and then discharge the lithium-ion battery with the current regulated by the Industry Standard or stipulated by the suppliers to discharge cut-off voltage regulated by the Industry Standard or stipulated by the suppliers, the discharge capacity would be standard capacity $C_0$. The standard charge cut-off voltage $U_0$ for lithium iron phosphate battery could selected from any the known voltage values (3.5V, 3.6V, 3.65V or 3.7V), the charging method for correcting and compensating voltage of the present invention $U=U_0+(U_0-U_S)+(U_0-U_{SO})=3U_0-U_S-U_{SO}$ can be applied to all when charging the battery with capacity close to the value of standard capacity $C_0$ during rapid charging.

It is well-known that for lithium cobalt battery, the standard charge cut-off voltage that most commonly and regularly used would be 4.2V. Now it has been developed lithium cobalt battery with high voltage of 4.3V and 4.35V, and now it is developing lithium cobalt battery with high voltage of 4.4V and 4.5V, which means the standard charge cut-off voltage $U_0$ is 4.3V, 4.35V, 4.4V and 4.5V. Different value of $U_0$ would attain different value of standard capacity $C_0$. The standard charge cut-off voltage $U_0$ for lithium cobalt battery of different voltage could be selected from any the known voltage values (4.3V, 4.35V, 4.4V or 4.5V), the charging method for correcting and compensating voltage of the present invention $U=U_0+(U_0-U_S)+(U_0-U_{SO})=3U_0-U_S-U_{SO}$ can be applied to all when charging the battery with capacity close to the value of standard capacity $C_0$ during rapid charging.

It is well-known that for ternary lithium battery, the standard charge cut-off voltage that most commonly and regularly used would be 4.2V. Now it has been developed ternary lithium battery of high voltage 4.3V and 4.35V, which means the standard charge cut-off voltage $U_0$ is 4.3V and 4.35V. Different value of $U_0$ would attain different value of standard capacity $C_0$. The standard charge cut-off voltage $U_0$ for ternary lithium battery of different voltage could selected from any the known voltage values (4.3V or 4.35V), the charging method for correcting and compensating voltage of the present invention $U=U_0+(U_0-U_S)+(U_0-U_{SO})=3U_0-U_S-U_{SO}$ can be applied to all when charging the battery with capacity close to the value of standard capacity $C_0$ during rapid charging.

Figure 2:
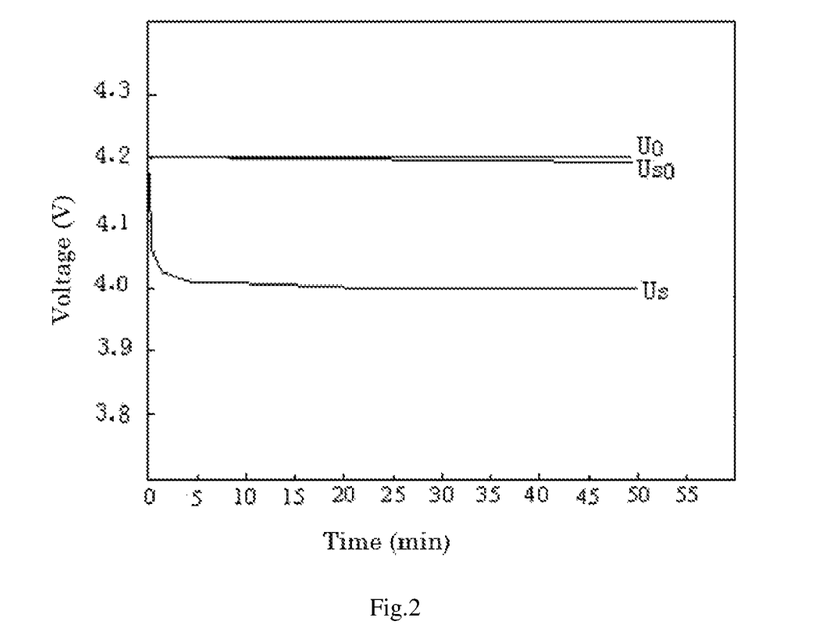
FIG. 2 is the curve of standard stabilized voltage $U_{SO}$ of lithium cobalt battery when it was constant-current and constant-voltage charged to $U_0$ and the curve of stabilized voltage $U_S$ when it was constant-current and constant-voltage charged to $U_0$.

Special cases: when standard charge cut-off voltage $U_0$ for lithium cobalt battery is selected as 4.2V (as shown in FIG. 2), $U_0 \approx U_{SO}$, stop charging the battery when it is charged to $U \approx U_0+(U_0-U_S)$, and attain almost the same effects as the battery charged to 4.2V by constant-current and constant-voltage charging method, that is to say, as to when standard charge cut-off voltage $U_0$ for lithium cobalt battery is selected as 4.2V, the corrected value $(U_0-U_S)$ could be negligible. However, when standard charge cut-off voltage $U_0$ for lithium cobalt battery is selected as other values, such as $U_0$=4.35V shown in FIG. 3, the value of $U_0$ is greatly different from that of $U_{SO}$, it should take the corrected value $(U_0-U_{SO})$ into account so as to make the battery charged to 100% saturation.

Compared to the existing charging method, the present invention has the following beneficial effects:

1. the lithium-ion battery could be rapidly charged and with the capacity that approximates to saturation;

2. the charging method disclosed by the present invention could be applied to charge all kinds of lithium-ion batteries, and charge the battery approximate to 100% saturation so as to make the most of the battery efficiency;

3. the lithium-ion battery charged by the charging method of the present invention, and discharge the battery with a regular or a user method, will have better cycle life than the battery charged by constant-current and constant-voltage charging method of the same charging rate; or with the same cycle frequency, the battery charged with the charging method of the present invention would have larger discharge capacity;

4. the method disclosed by the present invention could be designed as charging circuit and be made into battery charger;

5. the method disclosed by the present invention could be made into electronic parts and components and used when assembled with cells;

6. the method disclosed by the present invention could charge battery by constant-current and constant-voltage charging method, which is much more in line with charging habits of the battery users and the selection of charging integrated circuit (IC);

7. the method disclosed by the present invention could charge battery some certain value by constant-voltage charging method and then stop charging the battery, which is much more easily to be implemented.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Comparing Example 1-1: Lithium Iron Phosphate Battery Standard Charging Method 402045Fe15C is lithium iron phosphate battery of high charging rate and with power parameters of 3.2V 190 mAh, which belongs to the LiFePO4/C battery system single cell ($U_0$=3.6V), with nominal capacity Cr=190 mAh. According to GBT18287-2013 standard charging method:

1. constant-current charge the battery with 38 mA current (0.2C) to 3.6V, and then constant-voltage charge the lithium-ion battery with 3.6V until the current decreases to 3.8 mA (0.02C), and then stop charging and record the charging time $T_C$ and charge capacity $C_C$;
2. constant-current discharge the battery with 38 mA current (0.2C) to 2V, and then record the discharge capacity $C_d$; (this step could evaluate the discharge capacity after charging, so it is not a necessary step for the charging method)
3. cycling procedures:
3.1 constant-current charge the battery with 1140 mA current to 3.6V, and then constant-voltage charge the lithium-ion battery with 3.6V until the current decreases to 3.8 mA;
3.2 lay up the battery for 5 minutes;
3.3 constant-current discharge the battery with 1140 mA current to 2V;
3.4 lay up the battery for 5 minutes;
3.5 keep cycling between the step 3.1 to step 3.4 for 1000 times;
3.6 end.

Comparing Example 1-2: Lithium Iron Phosphate Battery Charging Method of CN101388477B The same lithium iron phosphate battery as comparing example 1-1 (402045Fe15C), it is expected to charge the battery to saturation within 10 minutes. According to the rapid charging method disclosed by CN101388477B, the current used for constant-current and constant-voltage charging I=$C_r$/t*60=190/10*60=1140 mA (6C charging rate).

Figure 1:
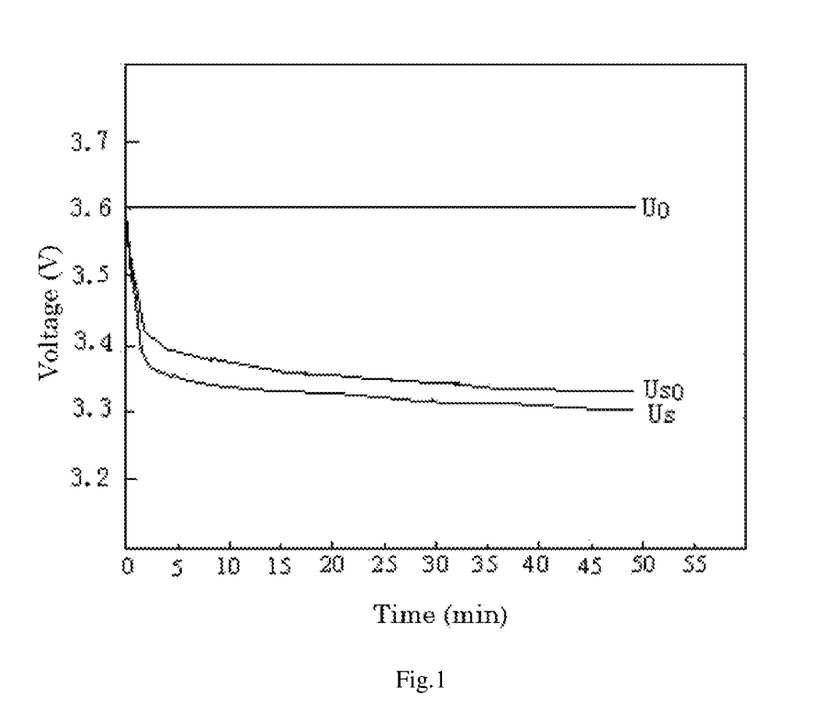
FIG. 1 is the curve of standard stabilized voltage $U_{SO}$ of lithium iron phosphate battery when it was constant-current and constant-voltage charged to $U_0$ and the curve of stabilized voltage $U_S$ when it was constant-current and constant-voltage charged to $U_0$.

1. measure the stabilized voltage: constant-current charge the battery with 1140 mA current to 3.6V, then stop charging and measure the voltage of the open circuit and obtain the stabilized voltage $U_S$, the curve of stabilized voltage $U_S$ is shown in FIG. 1; when stopping constant-current and constant-voltage charging the lithium-ion battery and starting to lay up the lithium-ion battery, start timing; select every 10 minutes as a time interval; from some time point, the open-circuit voltage-drop of the lithium-ion battery would be smaller than 1 mV during 10 minutes time interval, which means the battery voltage has already been in a stable state, then select the voltage corresponding to the first time point of said 10 minutes as stabilized voltage $U_S$ of the battery;
2. constant-current discharge the battery with 38 mA current (0.2C) to 2V (this step discharge the capacity charged by step 1, making the battery in a awaiting charged state so it is not a necessary step for the charging method);
3. constant-current charge the lithium-ion battery with 1140 mA to $2U_0$–$U_S$, and then stop charging, record the charging time $T_C$ and charge capacity $C_C$;
4. constant-current discharge the battery with 38 mA current (0.2C) to 2V, and then record the discharge capacity $C_d$; (this step could evaluate the discharge capacity after charging, so it is not a necessary step for the charging method)
5. cycling procedures:
5.1 constant-current charge the lithium-ion battery with 1140 mA to $2U_0$–$U_S$;
5.2 lay up the battery for 5 minutes;
5.3 constant-current discharge the battery with 1140 mA current to 2.0V;
5.4 lay up the battery for 5 minutes;
5.5 keep cycling between the step 5.1 to step 5.4 for 1000 times;
5.6 end.

Embodiment 1: Lithium Iron Phosphate Battery the Charging Method of the Present Invention The same lithium iron phosphate battery as comparing example 1-1 (402045Fe15C), and the same stabilized voltage $U_S$ measured in comparing example 1-2.

1. measure the standard stabilized voltage: constant-current charge the battery with 38 mA (0.2C) current to 3.6V, then current-voltage charge the battery with 3.6V voltage until the current decreases to 3.8 mA (0.02C), and then stop charging and measure the voltage of the open circuit and obtain the standard stabilized voltage $U_{SO}$, the curve of stabilized voltage $U_{SO}$ is shown in FIG. 1; when stopping constant-current and constant-voltage charging the lithium-ion battery and starting to lay up the lithium-ion battery, start timing; select every 10 minutes as a time interval; from some time point, the open-circuit voltage-drop of the lithium-ion battery would be smaller than 1 mV during 10 minutes time interval, which means the battery voltage has already been in a stable state, then select the voltage corresponding to the first time point of said 10 minutes as standard stabilized voltage $U_{SO}$ of the battery;
2. constant-current discharge the battery with 38 mA current (0.2C) to 2V (this step discharge the capacity charged by step 1, making the battery in a awaiting charged state so it is not a necessary step for the charging method);
3. it is expected to charge the battery to saturation within 10 minutes. According to the lithium-ion battery charging method for correcting and compensating voltage disclosed by the present invention, the current used for constant-current and constant-voltage charging would be 1140 mA (6C charging rate); when the battery is charged to $U=3U_0-U_S-U_{SO}$, stop charging and record the charging time $T_C$ and charge capacity $C_C$.

4. constant-current discharge the battery with 38 mA current (0.2C) to 2V, and then record the discharge capacity $C_d$; (this step could evaluate the discharge capacity after charging, so it is not a necessary step for the charging method)

5. cycling procedures:
  5.1 constant-current charge the lithium-ion battery with 1140 mA to $3U_0-U_S-U_{SO}$;
  5.2 lay up the battery for 5 minutes;
  5.3 constant-current discharge the battery with 1140 mA current to 2V;
  5.4 lay up the battery for 5 minutes;
  5.5 keep cycling between the step 5.1 to step 5.4 for 1000 times;
  5.6 end.

The experimental results of comparing example 1-1, comparing example 1-2 and embodiment 1 are listed in table 1:

|  | Comparing example 1-1 | Comparing example 1-2 | Embodiment 1 |
| --- | --- | --- | --- |
| Uo (V) | 3.6 | 3.6 | 3.6 |
| Us (V) | — | 3.312 | 3.312 |
| Uso (V) | — | — | 3.340 |
| Charging current (mA) | 38 | 1140 | 1140 |
| Charge cut-off current (mA) | 3.8 | 1140 | 1140 |
| Limited charge voltage (V) | 3.6 | 3.888 | 4.148 |
| Charging time Tc (min) | 338 | 9.2 | 10.5 |
| Charge Capacity Cc (mAh) | 198 | 175 | 199 |
| Discharge Capacity Cd (mAh) | 197 | 174 | 198 |
| Saturation level of charging | 100% | 88.3% | 100.5% |
| Capacity retention ratio after cycling for 1000 times | 85.2% | 88.4% | 89.3% |

The saturation level of charging: charge the battery by standard charging method, discharge the battery by standard discharge method, the discharge capacity is 100%; charge the battery by non-standard charging method, discharge the battery by standard discharge method, the percentage of discharge capacity of non-standard charging method to that of standard charging method is the saturation level of charging.

Embodiment 2: Lithium-Iron Phosphate Battery the Method of the Present Invention The same lithium-iron phosphate battery as the comparing example 1-1 (402045Fe15C), and the same stabilized voltage $U_S$ measured in the comparing example 1-2;

1. measure the standard stabilized voltage: constant-current charge the battery with 38 mA (0.2C) current to 3.6V, then current-voltage charge the battery with 3.6V voltage until the current decreases to 3.8 mA (0.02C), stop charging; measure the voltage of the open circuit and obtain the standard stabilized voltage $U_{SO}$, the curve of stabilized voltage $U_{SO}$ is shown in FIG. 1; when stopping constant-current and constant-voltage charging the lithium-ion battery and starting to lay up the lithium-ion battery, start timing; select every 10 minutes as a time interval; from some time point, the open-circuit voltage-drop of the lithium-ion battery would be smaller than 1 mV during 10 minutes time interval, which means the battery voltage has already been in a stable state, then select the voltage corresponding to the first time point of said 10 minutes as standard stabilized voltage $U_{SO}$ of the battery;

2. constant-current discharge the battery with 38 mA current (0.2C) to 2.0V (this step discharges the capacity charged by step 1, making the battery in a awaiting charged state so it is not a necessary step for the charging method);

3. it is expected to charge the battery to saturation within 10 minutes. According to the lithium-ion battery charging method for correcting and compensating voltage disclosed by the present invention, the current used for constant-current charging would be 1140 mA (6C charging rate); when the battery is charged to $U=3U_0-U_S-U_{SO}$, start to constant-voltage charge the battery, keep on constant-voltage charging until the charging current decreases to 95% of the charging current before constant-voltage charging, and then stop charging the battery; record the charging time $T_C$ and charge capacity $C_C$.

4. constant-current discharge the battery with 38 mA current (0.2C) to 2V, and then record the discharge capacity $C_d$; (this step could evaluate the discharge capacity after charging, so it is not a necessary step for the charging method)

5. cycling procedures:
  5.1 constant-current charge the lithium-ion battery with 1140 mA to $3U_0-U_S-U_{SO}$, then start to constant-voltage charge the battery, until the charging method decreases to 1083 mA (95% of the charging current before constant-voltage charging), and then stop charging the battery;
  5.2 lay up the battery for 5 minutes;
  5.3 constant-current discharge the battery with 1140 mA current to 2.0V;
  5.4 lay up the battery for 5 minutes;
  5.5 keep cycling between the step 5.1 to step 5.4 for 1000 times;
  5.6 end.

The experimental results of comparing example 1-1, comparing example 1-2 and embodiment 2 are listed in table 2:

|  | Comparing example 1-1 | Comparing example 1-2 | Embodiment 2 |
| --- | --- | --- | --- |
| Uo (V) | 3.6 | 3.6 | 3.6 |
| Us (V) | — | 3.312 | 3.312 |
| Uso (V) | — | — | 3.340 |
| Charging current (mA) | 38 | 1140 | 1140 |
| Charge cut-off current (mA) | 3.8 | 1140 | 1083 |
| Limited charge voltage (V) | 3.6 | 3.888 | 4.148 |
| Charging time Tc (min) | 338 | 9.2 | 10.6 |
| Charge Capacity Cc (mAh) | 198 | 175 | 200 |
| Discharge Capacity Cd (mAh) | 197 | 174 | 199 |
| Saturation level of charging | 100% | 88.3% | 101.0% |
| Capacity retention ratio after cycling for 1000 times | 85.2% | 88.4% | 88.2% |

The saturation level of charging: charge the battery by standard charging method and discharge the battery by standard discharge method, the discharge capacity is 100%; charge the battery by non-standard charging method and discharge the battery by standard discharge method, the percentage of discharge capacity of non-standard charging method to that of standard charging method is the saturation level of charging.

Comparing Example 3-1: Lithium Cobalt Battery Standard Charging Method

703048H10C is polymer lithium-ion battery of high charging rate and with power parameters of 3.7V 800 mAh, which belongs to the LiCoO$_2$/C battery system single cell (U$_0$=4.2V), with nominal capacity Cr=800 mAh. According to GBT18287-2013 standard charging method:

1. constant-current charge the battery with 160 mA current (0.2C) to 4.2V, and then constant-voltage charge the lithium-ion battery with 4.2V until the current decreases to 16 mA (0.02C), then stop charging and the charging time T$_C$ and charge capacity C$_C$;

2. constant-current discharge the battery with 160 mA current (0.2C) to 3.0V, and then record the discharge capacity C$_d$; (this step could evaluate the discharge capacity after charging, so it is not a necessary step for the charging method)

3. cycling procedures:
   3.1 constant-current charge the battery with 4800 mA current to 4.2V, and then constant-voltage charge the lithium-ion battery with 4.2V until the current decreases to 16 mA;
   3.2 lay up the battery for 5 minutes;
   3.3 constant-current discharge the battery with 4800 mA current to 3V;
   3.4 lay up the battery for 5 minutes;
   3.5 keep cycling between the step 3.1 to step 3.4 for 500 times;
   3.6 end.

Comparing Example 3-2: Lithium Cobalt Battery Charging Method of CN101388477B

The same polymer lithium-ion battery as comparing example 2-1 (703048H10C), it is expected to charge the battery to saturation within 10 minutes. According to the rapid charging method disclosed by CN101388477B, the current used for constant-current and constant-voltage charging I=C$_r$/t*60=800/10*60=4800 mA (6C charging rate).

1. measure the standard stabilized voltage: constant-current charge the battery with 4800 mA current to 4.2V, stop charging and measure the voltage of the open circuit and obtain the standard stabilized voltage U$_{SO}$, the curve of stabilized voltage U$_{SO}$ is shown in FIG. 2; when stopping constant-current and constant-voltage charging the lithium-ion battery and starting to lay up the lithium-ion battery, start timing; select every 10 minutes as a time interval; from some time point, the open-circuit voltage-drop of the lithium-ion battery would be smaller than 1 mV during 10 minutes time interval, which means the battery voltage has already been in a stable state, then select the voltage corresponding to the first time point of said 10 minutes as stabilized voltage U$_S$ of the battery;

2. constant-current discharge the battery with 160 mA current (0.2C) to 3.0V (this step discharge the capacity charged by step 1, making the battery in an awaiting charged state so it is not a necessary step for the charging method);

3. constant-current charge the lithium-ion battery with 4800 mA to 2U$_0$–U$_S$, then stop charging and record the charging time T$_C$ and charge capacity C$_C$;

4. constant-current discharge the battery with 160 mA current (0.2C) to 3V, and then record the discharge capacity C$_d$. (this step could evaluate the discharge capacity after charging, so it is not a necessary step for the charging method)

5. cycling procedures:
   5.1 constant-current charge the lithium-ion battery with 4800 mA to 2U$_0$–U$_S$;
   5.2 lay up the battery for 5 minutes;
   5.3 constant-current discharge the battery with 4800 mA current to 3V;
   5.4 lay up the battery for 5 minutes;
   5.5 keep cycling between the step 5.1 to step 5.4 for 500 times;
   5.6 end.

Embodiment 3: Lithium Cobalt Battery the Charging Method of the Present Invention The same lithium cobalt battery as comparing example 3-1 (703048H10C), and the same stabilized voltage U$_S$ measured in comparing example 3-2.

1. measure the standard stabilized voltage: constant-current charge the battery with 160 mA (0.2C) current to 4.2V, then current-voltage charge the battery with 4.2V voltage until the current decreases to 16 mA (0.02C), stops charging and measure the voltage of the open circuit and obtain the standard stabilized voltage U$_{SO}$, the curve of stabilized voltage U$_S$ is shown in FIG. 2; when stopping constant-current and constant-voltage charging the lithium-ion battery and starting to lay up the lithium-ion battery, start timing; select every 10 minutes as a time interval; from some time point, the open-circuit voltage-drop of the lithium-ion battery would be smaller than 1 mV during 10 minutes time interval, which means the battery voltage has already been in a stable state, then select the voltage corresponding to the first time point of said 10 minutes as standard stabilized voltage of the battery U$_{SO}$;

2. constant-current discharge the battery with 160 mA current (0.2C) to 3V (this step discharge the capacity charged by step 1, making the battery in a awaiting charged state so it is not a necessary step for the charging method);

3. it is expected to charge the battery to saturation within 10 minutes. According to the lithium-ion battery charging method for correcting and compensating voltage disclosed by the present invention, the current used for constant-current and constant-voltage charging would be 4800 mA (6C charging rate); when the battery is charged to U=3U$_0$–U$_S$–U$_{SO}$, stop charging and record the charging time T$_C$ and charge capacity C$_C$.

4. constant-current discharge the battery with 160 mA current (0.2C) to 3V, and then record the discharge capacity C$_d$. (this step could evaluate the discharge capacity after charging, so it is not a necessary step for the charging method)

5. cycling procedures:
   5.1 constant-current charge the lithium-ion battery with 4800 mA to 3U$_0$–U$_S$–U$_{SO}$;
   5.2 lay up the battery for 5 minutes;
   5.3 constant-current discharge the battery with 4800 mA current to 3V;
   5.4 lay up the battery for 5 minutes;
   5.5 keep cycling between the step 5.1 to step 5.4 for 500 times;
   5.6 end.

The experimental results of comparing example 3-1, comparing example 3-2 and embodiment 3 are listed in table 3:

|  | Comparing example 3-1 | Comparing example 3-2 | Embodiment 3 |
|---|---|---|---|
| Uo (V) | 4.2 | 4.2 | 4.2 |
| Us (V) | — | 4.016 | 4.016 |
| Uso (V) | — | — | 4.196 |

-continued

|  | Comparing example 3-1 | Comparing example 3-2 | Embodiment 3 |
|---|---|---|---|
| Charging current (mA) | 160 | 4800 | 4800 |
| Charge cut-off current (mA) | 16 | 4800 | 4800 |
| Limited charge voltage (V) | 4.2 | 4.384 | 4.388 |
| Charging time Tc (min) | 344 | 10.0 | 10.3 |
| Charge Capacity Cc (mAh) | 826 | 802 | 824 |
| Discharge Capacity Cd (mAh) | 825 | 801 | 823 |
| Saturation level of charging | 100% | 97.1% | 99.8% |
| Capacity retention ratio after cycling for 500 times | 81.3% | 85.2% | 86.3% |

Embodiment 4: Lithium Cobalt Battery Charging Method Disclosed by the Present Invention The same polymer lithium-ion battery as comparing example 3-1 (703048H10C), and the same stabilized voltage $U_S$ measured in comparing example 3-2.

1. measure the standard stabilized voltage: constant-current charge the battery with 160 mA (0.2C) current to 4.2V, then start to constant-voltage charge the battery with voltage of 4.2V, until the charging current decreases to 16 mA (0.02C), stop charging the battery; measure the voltage of the open circuit and obtain the standard stabilized voltage $U_{SO}$, the curve of standard stabilized voltage $U_{SO}$ is shown in FIG. 2; when stopping constant-current and constant-voltage charging the lithium-ion battery and starting to lay up the lithium-ion battery, start timing; select every 10 minutes as a time interval; from some time point, the open-circuit voltage-drop of the lithium-ion battery would be smaller than 1 mV during 10 minutes time interval, which means the battery voltage has already been in a stable state, then select the voltage corresponding to the first time point of said 10 minutes as standard stabilized voltage $U_{SO}$ of the battery;

2. constant-current discharge the battery with 160 mA current (0.2C) to 3.0V; (this step discharge the capacity charged by step 1, making the battery in an awaiting charged state so it is not a necessary step for the charging method)

3. it is expected to charge the battery to saturation within 10 minutes; According to the lithium-ion battery charging method for correcting and compensating voltage disclosed by the present invention, the current used for constant-current charging would be 4800 mA (6C charging rate); when the battery is charged to $U=3U_0-U_S-U_{SO}$, start to constant-voltage charge the battery until the charging current decreases to 95% of the current before constant-voltage charging; record the charging time $T_C$ and charge capacity $C_C$;

4. constant-current discharge the battery with 160 mA current (0.2C) to 3.0V, and then record the discharge capacity $C_d$; (this step could evaluate the discharge capacity after charging, so it is not a necessary step for the charging method)

5. cycling procedures:

5.1 constant-current charge the battery with 4800 mA to $3U_0-U_S-U_{SO}$, then start to constant-charge the battery until the charging current decreases to 4560 mA (95% of the current before constant-voltage charging);

5.2 lay up the battery for 5 minutes;

5.3 constant-current discharge the battery with 4800 mA current to 3.0V;

5.4 lay up the battery for 5 minutes;

5.5 keep cycling between the step 5.1 to step 5.4 for 500 times;

5.6 end.

The experimental results of comparing example 3-1, comparing example 3-2 and embodiment 4 are listed in table 4:

|  | Comparing example 3-1 | Comparing example 3-2 | Embodiment 4 |
|---|---|---|---|
| Uo (V) | 4.2 | 4.2 | 4.2 |
| Us (V) | — | 4.016 | 4.016 |
| Uso (V) | — | — | 4.196 |
| Charging current (mA) | 160 | 4800 | 4800 |
| Charge cut-off current (mA) | 16 | 4800 | 4560 |
| Limited charge voltage (V) | 4.2 | 4.384 | 4.388 |
| Charging time Tc (min) | 344 | 10.0 | 10.4 |
| Charge capacity Cc (mAh) | 826 | 802 | 830 |
| Discharge capacity Cd (mAh) | 825 | 801 | 828 |
| Saturation level of charging | 100% | 97.1% | 100.5% |
| Capacity retention ratio after cycling for 500 times | 81.3% | 85.2% | 85.1% |

Comparing Example 5-1: Lithium Cobalt Battery of High-Voltage 4.35V Standard Charging Method 60120HV10C is polymer lithium-ion battery of high voltage 4.35V and with power parameters of 235 mAh, which belongs to the $LiCoO_2/C$ battery system single cell ($U_0$=4.35V), with nominal capacity Cr=235 mAh. According to GBT18287-2013 standard charging method:

1. constant-current charge the battery with 47 mA current (0.2C) to 4.35V, and then constant-voltage charge the lithium-ion battery with 4.35V until the current decreases to 4.7 mA (0.02C), then stop charging and record the charging time $T_C$ and charge capacity $C_C$;

2. constant-current discharge the battery with 47 mA current (0.2C) to 3V, and then record the discharge capacity $C_d$. (this step could evaluate the discharge capacity after charging, so it is not a necessary step for the charging method)

3. cycling procedures:

3.1 constant-current charge the battery with 470 mA current to 4.35V, and then constant-voltage charge the lithium-ion battery with 4.35V until the current decreases to 4.7 mA;

3.2 lay up the battery for 5 minutes;

3.3 constant-current discharge the battery with 470 mA current to 3V;

3.4 lay up the battery for 5 minutes;

3.5 keep cycling between the step 3.1 to step 3.4 for 500 times;

3.6 end.

Comparing Example 5-2: Lithium Cobalt Battery of High-Voltage 4.35V Charging Method of CN101388477B The same polymer lithium-ion battery as comparing example 5-1 (60120HV10C), it is expected to charge the battery to saturation within 30 minutes. According to the rapid charging method disclosed by CN101388477B, the current used for constant-current and constant-voltage charging I=$C_r$/t*60=235/30*60=470 mA (2C charging rate).

Figure 3:
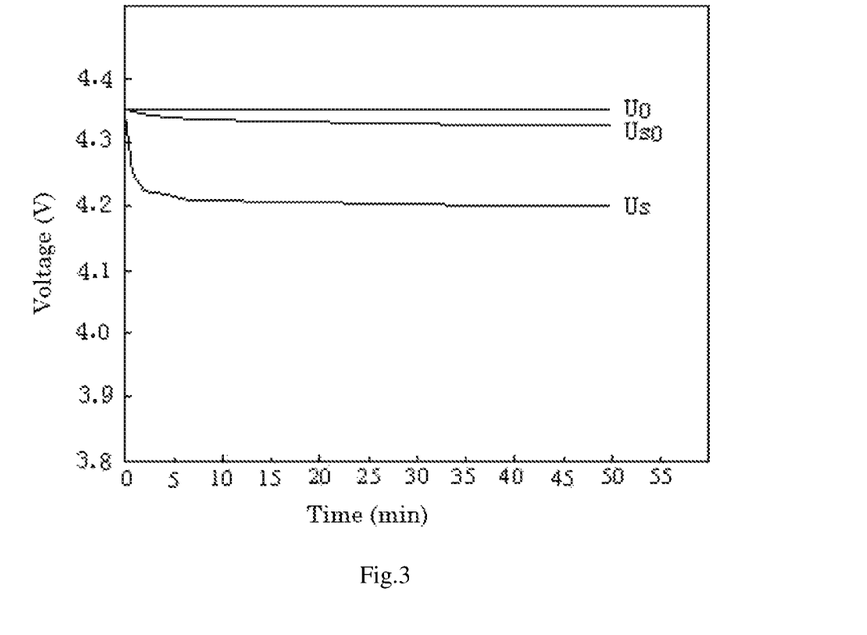
FIG. 3 is the curve of standard stabilized voltage $U_{SO}$ of lithium cobalt battery of 4.35V when it was constant-current and constant-voltage charged to $U_0$ and the curve of stabilized voltage $U_S$ when it was constant-current and constant-voltage charged to $U_0$.

1. measure the stabilized voltage: constant-current charge the battery with 470 mA current to 4.35V, stops charging and measure the voltage of the open circuit and obtain the stabilized voltage $U_S$, the curve of stabilized voltage $U_S$ is shown in FIG. 3; when stopping constant-current and constant-voltage charging the lithium-ion battery and starting to lay up the lithium-ion battery, start timing; select every 5 minutes as a time interval; from some time point, the open-circuit voltage-drop of the lithium-ion battery would be smaller than 2 mV during 5 minutes time interval, which means the battery voltage has already been in a stable state, then select the voltage corresponding to the first time point of said 5 minutes as stabilized voltage of the battery $U_S$;

2. constant-current discharge the battery with 47 mA current (0.2C) to 3V (this step discharge the capacity charged by step 1, making the battery in an awaiting charged state so it is not a necessary step for the charging method);

3. constant-current charge the lithium-ion battery with 470 mA to $2U_0-U_S$, then stop charging and record the charging time $T_C$ and charge capacity $C_C$;

4. constant-current discharge the battery with 47 mA current (0.2C) to 3V, and then record the discharge capacity $C_d$. (this step could evaluate the discharge capacity after charging, so it is not a necessary step for the charging method)

5. cycling procedures:
   5.1 constant-current charge the lithium-ion battery with 470 mA to $2U_0-U_S$;
   5.2 lay up the battery for 5 minutes;
   5.3 constant-current discharge the battery with 470 mA current to 3V;
   5.4 lay up the battery for 5 minutes;
   5.5 keep cycling between the step 5.1 to step 5.4 for 500 times;
   5.6 end.

Embodiment 5: Lithium Cobalt Battery of High-Voltage 4.35V the Charging Method of the Present Invention The same lithium cobalt battery as comparing example 5-1 (60120HV10C), and the same stabilized voltage $U_S$ measured in comparing example 5-2.

1. measure the standard stabilized voltage: constant-current charge the battery with 47 mA (0.2C) current to 4.35V, then current-voltage charge the battery with 4.35V voltage until the current decreases to 4.7 mA (0.02C), stop charging and measure the voltage of the open circuit and obtain the standard stabilized voltage $U_{SO}$, the curve of stabilized voltage $U_{SO}$ is shown in FIG. 3; when stopping constant-current and constant-voltage charging the lithium-ion battery and starting to lay up the lithium-ion battery, start timing; select every 5 minutes as a time interval; from some time point, the open-circuit voltage-drop of the lithium-ion battery would be smaller than 2 mV during 5 minutes time interval, which means the battery voltage has already been in a stable state, then select the voltage corresponding to the first time point of said 5 minutes as standard stabilized voltage of the battery $U_{SO}$;

2. constant-current discharge the battery with 47 mA current (0.2C) to 3V (this step discharge the capacity charged by step 1, making the battery in a awaiting charged state so it is not a necessary step for the charging method);

3. it is expected to charge the battery to saturation within 30 minutes. According to the lithium-ion battery charging method for correcting and compensating voltage disclosed by the present invention, the current used for constant-current and constant-voltage charging would be 470 mA (2C charging rate); when the battery is charged to $U=3U_0-U_S-U_{SO}$, stops charging and record the charging time $T_C$ and charge capacity $C_C$.

4. constant-current discharge the battery with 47 mA current (0.2C) to 3V, and then record the discharge capacity $C_d$. (this step could evaluate the discharge capacity after charging, so it is not a necessary step for the charging method)

5. cycling procedures:
   5.1 constant-current charge the lithium-ion battery with 470 mA to $3U_0-U_S-U_{SO}$;
   5.2 lay up the battery for 5 minutes;
   5.3 constant-current discharge the battery with 470 mA current to 3V;
   5.4 lay up the battery for 5 minutes;
   5.5 keep cycling between the step 5.1 to step 5.4 for 500 times;
   5.6 end.

The experimental results of comparing example 5-1, comparing example 5-2 and embodiment 5 are listed in table 5:

|  | Comparing example 5-1 | Comparing example 5-2 | Embodiment 5 |
|---|---|---|---|
| Uo (V) | 4.35 | 4.35 | 4.35 |
| Us (V) | — | 4.216 | 4.216 |
| Uso (V) | — | — | 4.333 |
| Charging current (mA) | 47 | 470 | 470 |
| Charge cut-off current (mA) | 4.7 | 470 | 470 |
| Limited charge voltage (V) | 4.2 | 4.484 | 4.501 |
| Charging time Tc (min) | 341 | 30.8 | 31.4 |
| Charge Capacity Cc (mAh) | 245 | 239 | 246 |
| Discharge Capacity Cd (mAh) | 244 | 238 | 245 |
| Saturation level of charging | 100% | 97.5% | 100.4% |
| Capacity retention ratio after cycling for 500 times | 75.4% | 78.2% | 78.3% |

Embodiment 6: Lithium Cobalt Battery of High-Voltage 4.35V Charging Method Disclosed by the Present Invention The same polymer lithium-ion battery as comparing example 5-1 (60120HV10C), and the same stabilized voltage $U_S$ measured in comparing example 5-2.

1. measure the standard stabilized voltage: constant-current charge the battery with 47 mA (0.2C) current to 4.35V, then current-voltage charge the battery with 4.35V voltage until the current decreases to 4.7 mA (0.02C), stop charging; measure the voltage of the open circuit and obtain the standard stabilized voltage $U_{SO}$, the curve of stabilized voltage $U_{SO}$ is shown in FIG. 3; when stopping constant-current and constant-voltage charging the lithium-ion battery and starting to lay up the lithium-ion battery, start timing; select every 5 minutes as a time interval; from some time point, the open-circuit voltage-drop of the lithium-ion battery would be smaller than 2 mV during 5 minutes time interval, which means the battery voltage has already been in a stable state, then select the voltage corresponding to the first time point of said 5 minutes as standard stabilized voltage $U_{SO}$ of the battery;

2. constant-current discharge the battery with 47 mA current (0.2C) to 3.0V; (this step discharge the capacity charged by step 1, making the battery in a awaiting charged state so it is not a necessary step for the charging method)

3. it is expected to charge the battery to saturation within 30 minutes; According to the lithium-ion battery charging method for correcting and compensating voltage disclosed by the present invention, the current used for constant-current charging would be 470 mA (2C charging rate); when the battery is charged to $U=3U_0-U_S-U_{SO}$, start to constant-voltage charge the battery until the charging current decreases to 95% of the charging current before constant-voltage charging; record the charging time $T_C$ and charge capacity $C_C$.

4. constant-current discharge the battery with 47 mA current (0.2C) to 3.0V, and then record the discharge capacity $C_d$, (this step could evaluate the discharge capacity after charging, so it is not a necessary step for the charging method)

5. cycling procedures:

5.1 constant-current charge the lithium-ion battery with 470 mA to $3U_0-U_S-U_{SO}$, then start charging by constant-voltage charging and won't stop charging until the charging current decreases to 446.5 mA (95% of the current before constant-voltage charging);

5.2 lay up the battery for 5 minutes;

5.3 constant-current discharge the battery with 470 mA current to 3.0V;

5.4 lay up the battery for 5 minutes;

5.5 keep cycling between the step 5.1 to step 5.4 for 500 times;

5.6 end.

The experimental results of comparing example 5-1, comparing example 5-2 and embodiment 6 are listed in table 6:

|  | Comparing example 5-1 | Comparing example 5-2 | Embodiment 6 |
|---|---|---|---|
| Uo (V) | 4.35 | 4.35 | 4.35 |
| Us (V) | — | 4.216 | 4.216 |
| Uso (V) | — | — | 4.333 |
| Charging current (mA) | 47 | 470 | 470 |
| Charge cut-off current (mA) | 4.7 | 470 | 446.5 |
| Limited charge voltage (V) | 4.2 | 4.484 | 4.501 |
| Charging time Tc (min) | 341 | 30.8 | 31.6 |
| Charge Capacity Cc (mAh) | 245 | 239 | 247 |
| Discharge Capacity Cd (mAh) | 244 | 238 | 246 |
| Saturation level of charging | 100% | 97.5% | 100.8% |
| Capacity retention ratio after cycling for 500 times | 75.4% | 78.2% | 77.8% |

Embodiment 7: Lithium Cobalt Battery Multi-Section Constant-Current Charging Method of the Present Invention with Charging Current 10C for First-Section and Charging Current 6C for Second-Section The same lithium cobalt battery as comparing example 3-1 (703048H10C), and the same stabilized voltage $U_S$ measured in comparing example 3-2

1. measure the standard stabilized voltage: constant-current charge the battery with 160 mA (0.2C) current to 4.2V, then current-voltage charge the battery with 4.2V voltage until the current decreases to 16 mA (0.02C), stop charging and measure the voltage of the open circuit and obtain the standard stabilized voltage $U_{SO}$, the curve of stabilized voltage $U_{SO}$ is shown in FIG. 2; when stopping constant-current and constant-voltage charging the lithium-ion battery and starting to lay up the lithium-ion battery, start timing; select every 10 minutes as a time interval; from some time point, the open-circuit voltage-drop of the lithium-ion battery would be smaller than 1 mV during 10 minutes time interval, which means the battery voltage has already been in a stable state, then select the voltage corresponding to the first time point of said 10 minutes as standard stabilized voltage of the battery $U_{SO}$;

2. constant-current discharge the battery with 160 mA current (0.2C) to 3V (this step discharge the capacity charged by step 1, making the battery in a awaiting charged state so it is not a necessary step for the charging method);

3. it is expected to charge the battery by multi-section constant-current charging method of the present invention with charging current 10C for first-section and charging current 6C for second-section to saturation within 10 minutes. According to the lithium-ion battery charging method for correcting and compensating voltage disclosed by the present invention, the constant-current for the first-section charging is 8000 mA (10C charging rate) and keep charging the battery for 3 minutes; the constant-current for the first-section charging is 4800 mA (6C charging rate), stop charging when the battery is charged to $U=3U_0-U_S-U_{SO}$ and record the total charging time $T_C$ and charge capacity $C_d$.

4. constant-current discharge the battery with 160 mA current (0.2C) to 3V, and then record the discharge capacity $C_d$. (this step could evaluate the discharge capacity after charging, so it is not a necessary step for the charging method)

5. cycling procedures:

5.1 constant-current charge the lithium-ion battery with 8000 mA for 3 minutes;

5.2 constant-current charge the lithium-ion battery with 4800 mA to $3U_0-U_S-U_{SO}$, 5.3 lay up the battery for 5 minutes;

5.4 constant-current discharge the battery with 4800 mA current to 3V;

5.5 lay up the battery for 5 minutes;

5.6 keep cycling between the step 5.1 to step 5.5 for 500 times;

5.7 end.

The experimental results of comparing example 3-1, comparing example 3-2 and embodiment 7 are listed in table 7:

|  | Comparing example 3-1 | Comparing example 3-2 | Embodiment 7 |
|---|---|---|---|
| Uo (V) | 4.2 | 4.2 | 4.2 |
| Us (V) | — | 4.016 | 4.016 |
| Uso (V) | — | — | 4.196 |
| Charging current (mA) | 160 | 4800 | (1) 8000 (2) 4800 |
| Charge cut-off current (mA) | 16 | 4800 | 4800 |
| Limited charge voltage (V) | 4.2 | 4.384 | 4.388 |
| Charging time Tc (min) | 344 | 10.0 | 8.3 |
| Charge Capacity Cc (mAh) | 826 | 802 | 825 |
| Discharge Capacity Cd (mAh) | 825 | 801 | 824 |
| Saturation level of charging | 100% | 97.1% | 99.9% |
| Capacity retention ratio after cycling for 500 times | 81.3% | 85.2% | 86.2% |

In the practical implementation, alternatively, (1). measure $U_S$ and $U_{SO}$ of every battery before every charging, and then charge the battery by the charging method of the present invention (or the charging method disclosed by CN101388477B), obviously it is cumbersome charging the battery in this way; (2). measure $U_S$ and $U_{SO}$ of every battery before charging, and each time charge the battery by the charging method of the present invention (or the charging method disclosed by CN101388477B), obviously it is cumbersome likewise; (3). measure $U_S$ and $U_{SO}$ of battery of every model before charging, and each time charge every battery of said battery model by the charging method of the present invention (or the charging method disclosed by CN101388477B), which is much more convenient. Although there may be slight difference between different battery of the same battery model, or between every charging of the same battery, which doesn't affect the implementation of the patent. The present invention could charge the battery close to saturation by charging method, while it could not guarantee charging the battery to 100% saturation.

In the practical implementation, it is not necessary to charge the battery only when the battery is completely discharged; it is allowed to charge the battery by the charging method disclosed by the present invention even the battery is in fully-discharged state, half-charged state, over half-charged state, while it is not necessary to charge the battery when it is fully charged.

While the invention has been described in terms of what is presently considered to be the most practical and preferred embodiments, those skilled in the art could make alterations and modifications based on the embodiments, such as applying the charging method in all kinds of lithium-ion batteries, battery pack, charging circuit, charger, charging control components and other products, therefore it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A Lithium-ion battery charging method for correcting and compensating voltage, comprising: stopping charging the battery when it is charged to limited charge voltage of the battery, wherein the limited charge voltage between the battery positive and negative electrodes is set as $3U_0-U_S-U_{SO}$; wherein, $U_{SO}$ is the standard stabilized voltage dropped from $U_0$ which the battery is charged to by constant-current and constant-voltage charging, whose value is selected by the following steps: when stopping constant-current and constant-voltage charging the lithium-ion battery and starting to lay up the lithium-ion battery, starting timing; performing division of time intervals during the timing, each time interval having a same time length; from some time point, the open-circuit voltage-drop of the lithium-ion battery would be smaller than a preset value during a time interval which the some time point belongs to, which means the battery voltage has already been in a stable state; then selecting the voltage corresponding to the first time point of said time interval as standard stabilized voltage $U_{SO}$ of the battery;

$U_S$ is the stabilized voltage dropped from $U_0$ which the battery is charged to by constant-current charging, whose value is selected by the following steps: when stopping constant-current and constant-voltage charging the lithium-ion battery and starting to lay up the lithium-ion battery, starting timing; performing division of time intervals during the timing, each time interval having a same time length; from some time point, the open-circuit voltage-drop of the lithium-ion battery would be smaller than a preset value during a time interval which the some time point belongs to, which means the battery voltage has already been in a stable state; then selecting the voltage corresponding to the first time point of the time interval as stabilized voltage $U_S$ of the battery;

$U_0$ is standard charge cut-off voltage and commonly recognized by the industry as the charge cut-off voltage used by the low power, constant-current and constant-voltage charging method.

2. The lithium-ion battery charging method for correcting and compensating voltage according to claim 1, wherein the battery is constant-current charged to U and then stopped charging.

3. The lithium-ion battery charging method for correcting and compensating voltage according to claim 1, wherein the battery is charged to U by multi-sections constant-current charging method and then stopped charging, wherein $U_S$ is determined by measuring the current of the end-section before stopping charging.

4. The lithium-ion battery charging method for correcting and compensating voltage according to claim 1, wherein the battery is charged to U by non-constant-current charging method and then stopped charging, wherein $U_S$ is determined by measuring the current of the end-section before stopping charging.

5. The lithium-ion battery charging method for correcting and compensating voltage according to claim 1, wherein comprising when stopping constant-current and constant-voltage charging the lithium-ion battery and starting to lay up the lithium-ion battery, starting timing; selecting every 5 minutes as a time interval; from some time point, the open-circuit voltage-drop of the lithium-ion battery would be smaller than 2 mV during 5 minutes time interval, which means the battery voltage has already been in a stable state; then selecting the voltage corresponding to the first time point of said 5 minutes as standard stabilized voltage $U_{SO}$ of the battery.

6. The lithium-ion battery charging method for correcting and compensating voltage according to claim 1, comprising when stopping constant-current and constant-voltage charging the lithium-ion battery and starting to lay up the lithium-ion battery, starting timing; selecting every 10 minutes as a time interval; from some time point, the open-circuit voltage-drop of the lithium-ion battery would be smaller than 1 mV during 10 minutes time interval, which means the battery voltage has already been in a stable state; then selecting the voltage corresponding to the first time point of said 10 minutes as standard stabilized voltage $U_{SO}$ of the battery.

7. The lithium-ion battery charging method for correcting and compensating voltage according to claim 1, wherein when the battery is selected as lithium cobalt battery of 4.2V, $U_0 \approx U_{SO}$, stop charging the battery when it is charged to $U \approx U_0+(U_0-U_S)$.

8. A lithium-ion battery charging method for correcting and compensating voltage, comprising: during the charging process, starting to constant-voltage charge the battery when it is charged to the voltage limited charge voltage U; keeping on constant-voltage charging until the charging current decreases to 50%~99.99% of the charging current before constant-voltage charging; and then stopping charging the battery, the limited charge voltage between the battery positive and negative electrodes is set as $3U_0-U_S-U_{SO}$; wherein, $U_{SO}$ is the standard stabilized voltage dropped from $U_0$ which the battery is charged to by constant-current and constant-voltage charging, whose value is selected by the following steps: when stopping constant-current and constant-voltage charging the lithium-ion battery and starting to lay up the lithium-ion battery, starting timing; performing division of time intervals during the timing, each time interval having a same time length; from some time point, the open-circuit voltage-drop of the lithium-ion battery would be smaller than a preset value during a time interval which the some time point belongs to, which means the battery voltage has already been in a stable state; then selecting the voltage corresponding to the first time point of said time interval as standard stabilized voltage $U_{SO}$ of the battery;

$U_S$ is the stabilized voltage dropped from $U_0$ which the battery is charged to by constant-current charging, whose value is selected by the following steps: when stopping constant-current and constant-voltage charging the lithium-ion battery and starting to lay up the lithium-ion battery, starting timing; performing division of time intervals during the timing, each time interval having a same time length; from some time point, the open-circuit voltage-drop of the lithium-ion battery would be smaller than a preset value during a time interval which the some time point belongs to, which means the battery voltage has already been in a stable state; then selecting the voltage corresponding to the first time point of the time interval as stabilized voltage $U_S$ of the battery;

$U_0$ is standard charge cut-off voltage and commonly recognized by the industry as the charge cut-off voltage used by the low power, constant-current and constant-voltage charging method.

9. The lithium-ion battery charging method for correcting and compensating voltage according to claim 8, wherein the battery is constant-current charged to limited charge voltage of the battery.

10. The lithium-ion battery charging method for correcting and compensating voltage according to claim 8, wherein the battery is charged to limited charge voltage of the battery by multi-section constant-current charging method, $U_S$ is determined by measuring the current of the end-section before stopping charging.

11. The lithium-ion battery charging method for correcting and compensating voltage according to claim 8, wherein the battery is charged to limited charge voltage of the battery by non-constant-current charging method, $U_S$ is determined by measuring the current of the end-section before stopping charging.

12. The lithium-ion battery charging method for correcting and compensating voltage according to claim 8, wherein when the battery is selected as lithium ion cobalt battery of 4.2V, $U_0 \approx U_{SO}$, stop charging the battery when it is charged to $U \approx U_0 + (U_0 - U_S)$.

13. The lithium-ion battery charging method for correcting and compensating voltage according to claim 8, comprising: when stopping constant-current and constant-voltage charging the lithium-ion battery and starting to lay up the lithium-ion battery, starting timing; selecting every 5 minutes as a time interval; from some time point, the open-circuit voltage-drop of the lithium-ion battery would be smaller than 2 mV during 5 minutes time interval, which means the battery voltage has already been in a stable state; then selecting the voltage corresponding to the first time point of said 5 minutes as standard stabilized voltage $U_{SO}$ of the battery.

14. The lithium-ion battery charging method for correcting and compensating voltage according to claim 8, comprising: when stopping constant-current and constant-voltage charging the lithium-ion battery and starting to lay up the lithium-ion battery, starting timing; selecting every 10 minutes as a time interval; from some time point, the open-circuit voltage-drop of the lithium-ion battery would be smaller than 1 mV during 10 minutes time interval, which means the battery voltage has already been in a stable state; then selecting the voltage corresponding to the first time point of said 10 minutes as standard stabilized voltage $U_{SO}$ of the battery.

* * * * *